F. T. LINNAN.
RING COUPLING FOR SHAFTS.
APPLICATION FILED APR. 28, 1915.
1,166,064.
Patented Dec. 28, 1915.
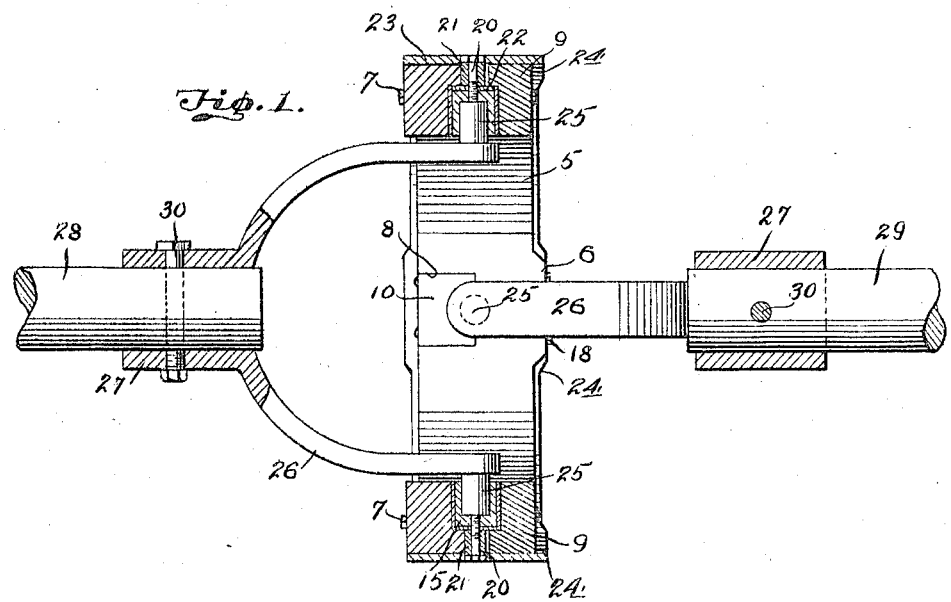
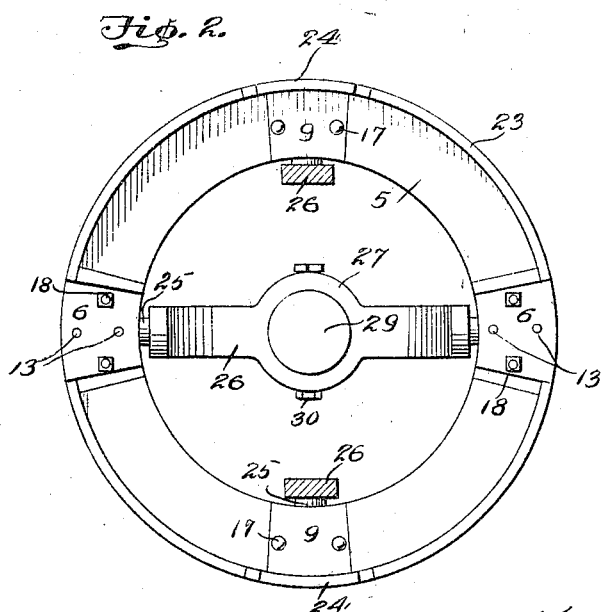
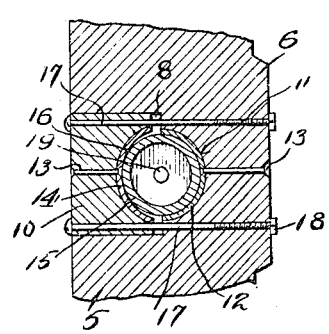
Witnesses
Edw. S. Hall.
Inventor
Frederick Thomas Linnan.
By Richard B. Owen.
Attorney

UNITED STATES PATENT OFFICE.

FREDERICK THOMAS LINNAN, OF SPRUCE, WEST VIRGINIA.

RING-COUPLING FOR SHAFTS.

1,166,064.  Specification of Letters Patent.  Patented Dec. 28, 1915.

Application filed April 28, 1915. Serial No. 24,527.

*To all whom it may concern:*

Be it known that I, FREDERICK THOMAS LINNAN, a citizen of the United States, residing at Spruce, in the county of Pocahontas and State of West Virginia, have invented certain new and useful Improvements in Ring-Couplings for Shafts, of which the following is a specification.

This invention relates to shaft couplings and is particularly concerned with the provision of a coupling for the meeting ends of line shafts or the like which shall afford thereto a universal-joint action.

As a principal object of this invention it is contemplated to provide what is more commonly termed a ring coupling to which yokes connected to the spaced adjacent shaft ends may be pivotally mounted at diametrically opposed points.

An object of equal importance is to construct a ring coupling of this character in which the trunnions of the shaft yokes shall be mounted in such manner as to render their removal easy of accomplishment and as to include half-bearings for each trunnion, one of which is secured to the ring while the opposite half is secured to the removable insert retaining the trunnion within the ring.

The above and additional objects which will become apparent as this explanatory description proceeds, are accomplished by such means as are illustrated in the accompanying drawings, described in the following specification and then more particularly pointed out in the claims which are appended hereto and form a part of this application.

With reference to the drawings, wherein there is illustrated the preferred embodiment of this invention as it is reduced to practice, and throughout the several views of which like characters of reference designate similar parts:—Figure 1 is a sectional view through the coupling ring with the shaft secured thereto, Fig. 2 is a face view of the ring, and Fig. 3 is a sectional view taken through mountings at right angles to Fig. 1.

The coupling ring of this invention is designated 5 in its entirety and is an annular casting of some such durable metal as steel or the like. Raised portions 6 are formed at the extremities of one of the ring's diameters and on one edge thereof while similar raised portions 7 are integrally formed on the opposite edge of the ring and in an alinement at right angles to that of the portions 6. These integral raised portions form braces opposite the trunnion bearings and the ring is peripherally cut away as denoted at 8 opposite each of these portions 6 and 7 in order to receive the bearing inserts 9 and 10, which are thus alined in opposite diametrical pairs. Communicating with each of these recesses 8 there are the semi-cylindrical bearing recesses 11 which are sheathed by properly conforming bushings 12, the latter being secured firmly in each recess through the medium of countersunk bolts 13 or a similar means. The inserts 9 and 10 have the same characteristics and are differentiated merely because of the opposite manner in which they are respectively positioned. Each of these inserts is also formed with a semicylindrical bearing recess, such recess being denoted 14 and being oppositely faced to the first recess 11 in order that the hollow cylindrical brass 15 may be readily accommodated in both recesses. Preferably the recess 14 has a slightly larger curvature than the recess 11 and is similarly lined with bushing material 16 secured to the insert 9 by means of the countersunk bolts 13.

The inserts 9 and 10 are themselves of such dimensions as not to entirely fill the recesses of the ring in which they are removably positioned, as is clearly shown in Fig. 3 where the resultant space may be advantageously filled by a lubricant for the bushings 16. Each of these inserts is removably secured within its recess of the ring 5 by means of bolts 17 whose threaded extremities extend through the opposite raised portion 5 or 6 and receive nuts 18 thereon.

Each of the brasses 15 has its back wall formed with a threaded aperture to receive the bolt 20 which maintains it within the bearing formed by the opposite recesses 11 and 14, such bolts 20 also passing through the bushing 21 which is spaced from the end of brass 15 through the medium of a washer 22. The head of the bolt 20 is countersunk within a rim 23 which is secured to the periphery of the ring 5 and is formed with widened portions 24 opposite each of the enlargements 5 and 6 in order to allow no parts to project.

Trunnions 25 are receivable within the cylindrical brasses 15 and opposite pairs of such trunnions are carried on the spaced extremities of opposite U-shaped yoke members 26 which are centrally enlarged into hubs 27 which securely mount the shafts 28 and 29 which are to be coupled, bolts 30 being employed for this purpose.

In assembling this shaft coupling the brasses 15 with the trunnions 25 positioned therein, and the bushing 21 and washers 22 are placed in the bearing recesses 11 of the ring 5 and the inserts 9 and 10 are then fitted into the ring recesses 8 in order to form the other half of the bearing for the brasses and are secured as previously indicated. When the trunnions have been placed in their respective brasses they are secured upon the shafts and the whole forms a coupling which has many advantages over those types of ring couplings previously employed on line shafting, chief among which are the following. In replacing one of the shafts 28 or 29, it is necessary to remove but the four bolts 19 carried by the two inserts which secure the yoke of the shaft to be replaced so that this taking down operation is considerably simplified. Secondly the replacing of the coupling brasses for either shaft need not interfere with those of the other shaft as is the case in previous forms of this type of coupling, which usually include in place of the inserts 9 and 10, a ring adapted to mate with the coupling ring. Other advantages which should be apparent are that the ring 5 need not be made as heavy as previously, owing to the fact that the inserts 9 and 10 do not weaken the structure of the ring as the old annular insert would, and that the bolts maintaining the inserts are subjected to very little centrifugal strain, owing to the solid shoulders formed by the recesses 8 which securely seat the inserts.

While in the foregoing however, there has thus been illustrated in the drawings and described in the specification such combination and arrangement of elements as constitute the preferred embodiment of this invention, it is desired to emphasize the fact that such minor changes in the matters of proportion and degree may be made in later adaptations of this device as shall not alter the spirit of the invention as defined in the appended claims.

What is claimed is:

1. In a shaft coupling, the combination with a recessed ring, of inserts receivable in the recesses of said ring, meeting half bearings carried by the inner wall of each recess and each insert, and yokes oppositely receivable in said bearings for connection to separate shafts.

2. In a shaft coupling, a ring formed with opposite pairs of diametrical enlargements, a recess being formed in said ring opposite each enlargement and having a bearing recess communicating therewith, an insert receivable in each of said ring recesses and formed with an opposite bearing recess to mate with one of the first said bearing recesses, and yokes oppositely receivable in pairs of diametrical bearing recesses for connection to separate shafts.

3. In a shaft coupling, a coupling ring formed with opposite pairs of diametrical enlargements and provided with a recess opposite each enlargement, an insert receivable in each of said ring recesses, opposite bearing recesses being formed in each insert and each ring recess, half bushings lining each of said bearing recesses, means removably securing each insert in its respective ring recess, a pair of shaft yokes, and diametrical trunnions for each of said yokes oppositely receivable in opposite ring recesses.

4. In a shaft coupling, a ring formed with reinforcing enlargements and provided with a recess opposite each such enlargement, an insert receivable in each ring recess, semicylindrical bearing recesses being formed in the inner wall of each ring recess and the inner face of each insert, half bushings lining each said bearing recess, cylindrical brasses receivable in said bushings, shaft yokes formed with central hubs, diametrical trunnions carried by each of said yokes and receivable in opposite brasses, and bushings countersunk peripherally of said ring to bear against respective brasses.

5. In a shaft coupling, the combination with a ring, of inserts removably secured in said ring, bearings carried by said ring and said inserts, and yokes mounted in said bearings for connection to separate shafts.

6. In a shaft coupling, the combination with a ring having bearings therein, removable members secured in said ring and carrying bearings coöperating with the first-mentioned bearings, and yokes positioned at right angles to one another and mounted in said bearings, said yokes being adapted for connection to separate shafts.

In testimony whereof I affix my signature in presence of two witnesses.

FREDERICK THOMAS LINNAN.

Witnesses:
 CHAS. P. SIVELY,
 S. F. CLARK.